United States Patent [19]

Kakizaki et al.

[11] Patent Number: 5,851,597
[45] Date of Patent: Dec. 22, 1998

[54] "PROCESS FOR SURFACE-TREATING BODY MADE OF METAL"

[75] Inventors: Masahiko Kakizaki, Tokyo; Masahiro Akimoto, Kanagawa, both of Japan

[73] Assignees: Sony Corporation, Tokyo; Denka Himaku Inc., Kanagawa, both of Japan

[21] Appl. No.: 802,532

[22] Filed: Feb. 18, 1997

[30] Foreign Application Priority Data

Feb. 20, 1996 [JP] Japan .................................. 8-032468

[51] Int. Cl.$^6$ .............................. C23C 22/00; B05D 1/18
[52] U.S. Cl. ........................................ 427/435; 427/430.1
[58] Field of Search ................................ 427/435, 430.1, 427/436, 437, 438

[56] References Cited

U.S. PATENT DOCUMENTS 5,266,356  11/1993  Buchheit, Jr. et al. ............... 427/443.2

FOREIGN PATENT DOCUMENTS 5-044048  2/1993  Japan .

*Primary Examiner*—Roy V. King
*Attorney, Agent, or Firm*—Hill & Simpson

[57] ABSTRACT

A process for surface-treating a body made of metal is disclosed, which includes a step of immersing the body made of metal in an aqueous solution containing at least one organometallic compound and at least one film-forming assistant, thereby forming a transparent film on a surface of the body made of metal. Further, in accordance with the present invention, there is provided a composition of matter including a substrate made of magnesium or a magnesium alloy and a transparent film formed on the substrate, which can be prepared by the process.

7 Claims, 1 Drawing Sheet

"PROCESS FOR SURFACE-TREATING BODY MADE OF METAL"

FIELD OF THE INVENTION

This invention relates to a process for surface-treating a body made of metal and a composition of matter produced by the process, and more particularly to a composition of matter having a transparent film thereon and a process for surface-treating a body made of metal by which the composition of matter can be produced.

BACKGROUND OF THE INVENTION

Metal materials and alloy materials have been widely utilized in various fields, for example as cladding materials, due to excellent mechanical properties and grave and massive appearance thereof. Especially, magnesium or magnesium alloy materials have the lightest weight among practically-used metal materials and exhibit a good machinability, a high ratio of strength to density and a good castability for die-cast, so that many studies have been made to apply the magnesium or magnesium alloy materials to various fields such as casings, structural members or various parts of computers, audio equipment, communication equipment, air planes, automobiles or the like.

However, the magnesium or magnesium alloy materials is deteriorated in anti-corrosion property and therefore readily anodized in an atmosphere so that a thin oxide film is readily produced on a surface thereof. Especially, when such magnesium or magnesium alloy materials are subjected to precision machining, there occurs a remarkable difference in an anti-corrosion property between respective surface regions thereof. Not only the magnesium or magnesium alloy materials but also other general metal materials poses this problem.

Therefore, in order to enhance an anti-corrosion property, an impact resistance, a film-adhesion property and the like, the magnesium or magnesium alloy materials have been conventionally subjected to an anodization treatment or other chemical treatments in which heavy metal salts such as chromates (containing hexavalent (VI) chromium), manganates or permanganates, or fluorides are used.

However, when the magnesium or magnesium alloy materials undergo the anodization treatment or other chemical treatments, there arises a serious problem that an inherent metallic appearance thereof is lost thereby.

For example, in the case where the magnesium or magnesium alloy materials are subjected to the anodization treatment or the other chemical treatments using heavy metal salts, an effluent resulting from each treatment is severely contaminated by the heavy metal salts. This is unfavorable from the standpoint of environmental protection.

Further, when the anodization treatment is adopted, there arise the following inconveniences.

That is, the anodic oxide film formed by the anodization treatment have a surface roughness three to ten times those of untreated magnesium or magnesium alloy materials. For this reason, it is extremely difficult for the anodized magnesium or magnesium alloy materials to attain aimed dimension after subjected to machining. Therefore, the machined magnesium or magnesium alloy materials are generally subjected to an abrasion process. However, since such an anodic oxide film is hard but brittle, there is a likelihood that falling-off of the anodic oxide film is caused at uneven sites thereof upon abrasion.

The anodic oxide film is provided with a huge number of pores each having a complicated shape and a diameter on the order of 3 to 10 $\mu$m. Such powders generated during the abrasion process enters into or adhered to the pores or the uneven sites of the anodic oxide film. When the powder is fallen off during the use, it functions as an abrasive so that the anodic oxide film is apt to undergo self-destruction.

Since the anodic oxide film has a large surface roughness as described above, there arises a further inconvenience that the thickness thereof is difficult to control.

SUMMARY OF THE INVENTION

It is therefore an object of the present invention to provide a process for surface-treating a body made of metal which resolves the above-mentioned problems.

It is another object of the present invention to provide a composition of matter which resolves the above-mentioned problems.

According to a first aspect of the present invention, there is provided a process for surface-treating a body made of metal, which includes a step of immersing the body made of metal in an aqueous solution containing at least one organometallic compound and at least one film-forming assistant, thereby forming a transparent film on the body made of metal.

According to a second aspect of the present invention, there is provided a composition of matter including a substrate and a transparent film formed on the substrate. The substrate may be made of magnesium or a magnesium alloy. The transparent film is formed on the substrate. The transparent film is prepared by immersing the substrate in an aqueous solution containing at least one organometallic compound and at least one film-forming assistant.

DETAILED DESCRIPTION OF THE INVENTION

Figure 1:
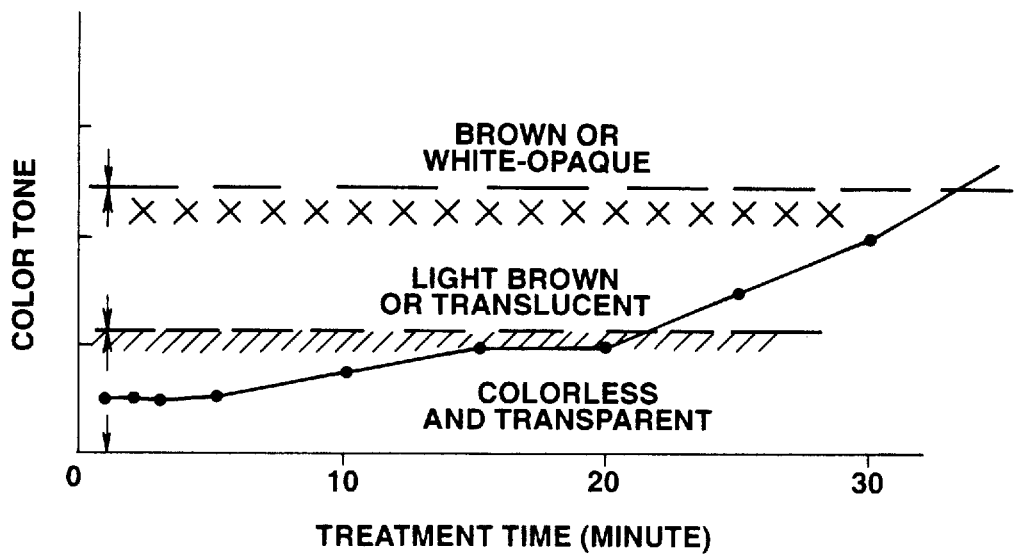
FIG. 1 is a characteristic curve showing the relationship between color tone of an anodic oxide film and treating time.

The process for surface-treating a body made of metal and the composition of matter produced thereby according to the present invention are described in detail below.

In order to achieve the above-mentioned objects, the present inventors have conducted a variety of experiments under various conditions in which the utmost efforts have been made to prevent harmful substances from entering in the process. As a result, it has been found that, by treating a metal material or an alloy material with an organometallic compound, for example, metal alkoxide, there can be obtained a high-quality film which is almost colorless and transparent and therefore capable of showing a metallic appearance inherent to the metal material or the alloy material as it is through the film.

The present invention has been accomplished based on the basis of the finding. The feature of the present invention resides in that the metal material or the alloy material is immersed in an aqueous solution containing at least one organometallic compound and at least one film-forming assistant.

The metal or alloy materials to be surface-treated according to the present invention may include any of general kinds of metal materials and any of general kinds of alloy materials. Especially, the present invention is suitably applied to magnesium or magnesium alloy materials (hereinafter referred to merely as "magnesium-based metal materials"). Hitherto, the surface treatment of the magnesium-based metal materials has been hitherto considered to be achieved only with a difficulty.

Examples of the magnesium alloy materials may include Mg/Al-based alloys, Mg/Mn-based alloys, Mg/Ca-based alloys, Mg/Li-based alloys, Mg/Ag-based alloys, Mg/rare earth element-based alloys or the like.

In the present invention, the metal or alloy material such as the afore-mentioned magnesium-based metal material is immersed in a treating solution to form a film on a surface thereof. At this time, as the treating solution, there can be used an organometallic compound-containing aqueous solution to which a film-forming assistant (such as a film-forming accelerator or a film-forming stabilizer) is further added.

The suitable organometallic compounds may include, for example, metal alkoxides, metal acetyl acetonates, metal carboxylates (salts of organic acid and metal) or the like. At least one organometallic compound selected from the above-enumerated compounds can be used in the present invention.

The metal alkoxides may be those represented by the general formula of $M(OR)_n$ where M is a metal element, R is an alkyl group and n is an oxidation number of the metal element. Examples of the metal alkoxides usable in the present invention may include alkoxides containing a single kind of metal, alkoxides containing two kinds of metals or the like.

The alkoxides containing a single kind of metal may be in the form of the combination of a metal selected from those belonging to IA, IB, IIA, IIB, IIIA, IIIB, IVA, IVB, VB and VIB groups of the Periodic Table, and an alkyl group.

Specific examples of these alkoxides containing a single kind of metal may include $LiOCH_3$, $NaOCH_3$, $Cu(OCH_3)_2$, $Ca(OCH_3)_2$, $Sr(OC_2H_5)_2$, $Ba(OC_2H_5)_2$, $Zn(OC_2H_5)_2$, $B(OCH_3)_3$, $Al(iso-OC_3H_7)_3$, $Ga(OC_2H_5)_3$, $Y(OC_4H_9)_3$, $Si(OC_2H_5)_4$, $Ge(OC_2H_5)_4$, $Pb(OC_4H_9)_4$, $P(OCH_3)_3$, $Sb(OC_2H_5)_3$, $VO(OC_2H_5)_3$, $Ta(OC_3H_7)_5$, $W(OC_2H_5)_6$ or the like. In addition, the alkoxides such as $Si(OCH_3)_4$, $Si(iso-OC_3H_7)_4$, $Si(t-OC_4H_9)_4$, $Ti(OCH_3)_4$, $Ti(OC_2H_5)_4$, $Ti(iso-OC_3H_7)_4$, $Ti(OC_4H_9)_4$, $Zr(OCH_3)_4$, $Zr(OC_2H_5)4$, $Zr(OC_3H_7)_4$, $Zr(OC_4H_9)_4$, $Al(OC_2H_5)_3$, $Al(OC_4H_9)_3$ or the like can also be used in the present invention.

As the alkoxides containing two kinds of metals, there may be used La/Al-based alkoxides, Mg/Al-based alkoxides, Ni/Al-based alkoxides, Zr/Al-based alkoxides, Ba/Zr-based alkoxides or the like. Specific examples of these alkoxides containing two kinds of metals may include $La[Al(iso-OC_3H_7)_4]_3$, $Mg[Al(iso-OC_3H_7)_4]_3$, $Mg[Al(sec-OC_4H_9)_4]_2$, $Ni[Al(iso-OC_3H_7)_4]_2$, $(CH_3O)_2Zr[Al(OC_3H_7)_4]_2$, $Ba[Zr_2(OC_2H_5)_9]_2$ or the like.

Example of the metal acetyl acetonates may include $In(COCH_2COOCH_3)$, $Zn(COCH_2COOCH_3)_2$ or the like. Examples of the metal carboxylates may include $Pb(CH_3COO)_2$, $Y(C_{17}H_{35}COO)_3$, $Ba(HCOO)_2$ or the like.

The afore-mentioned organometallic compounds can be used singly or in the form of a mixture of any two or more thereof. In any case, the content of the organometallic compound in the treating solution may be preferably in the range of 0.0005 to 10 mol/liter, more preferably 0.05 to 3 mol/liter. When the content of the organometallic compound in the treating solution is less than 0.0005 mol/liter, uneven film is likely to be produced. On the other hand, when the content of the organometallic compound in the treating solution is more than 10 mol/liter, there arises inconveniences such as the production of colored film, the occurrence of a so-called "smut" or the like.

In order to accelerate or stabilize the film formation and enhance a life time of the treating solution, a film-forming assistant (so-called film-forming accelerator or film-forming stabilizer) can be added to the treating solution.

As the film-forming accelerators or film-forming stabilizers, inorganic or organic compounds may be used. Specific examples of the inorganic compounds as the film-forming accelerators or film-forming stabilizers may include acids such as hydrochloric acid, sulfuric acid, nitric acid or hydrofluoric acid, alkalis such as ammonia, or the like. Specific examples of the organic compounds as the film-forming accelerators or film-forming stabilizers may include hydroxyl-containing compounds such as methanol, ethanol, propanol, butanol, ethylene glycol or diethylene glycol, carboxyl-containing compounds such as acetic acid or oxalic acid, amino-containing compounds such as triethanol amine, ethylene oxide, xylene, formamide, dimethyl formamide, dioxyacid or the like.

These film-forming accelerators or film-forming stabilizers may be used singly or in the form of a mixture of any two or more thereof.

The content of the film-forming accelerator or film-forming stabilizer in the treating solution is preferably in the range of 0.0001 to 50 mol/liter, more preferably 0.0005 to 10 mol/liter. When the content of the film-forming accelerator or film-forming stabilizer in the treating solution is less than 0.0001 mol/liter, the treating bath is rendered unstable. On the other hand, when the content of the film-forming accelerator or film-forming stabilizer in the treating solution is more than 50 mol/liter, the resulting film is apt to undergo so-called "blushing", "unevenness" or "blotches or stains", so that care must be taken upon handling and a stable anti-corrosion property thereof cannot be obtained.

As described above, in the present invention, the metal or alloy material such as the magnesium-based metal material is surface-treated by immersing in the thus-adjusted treating solution. At this time, the temperature of a bath containing the treating solution is preferably in the range of 0° to 50° C.

The treating time for which the metal or alloy materials are surface-treated with the treating solution is varied, but optionally determined, depending upon kinds of materials to be treated, the composition of the treating solution, kinds of additives added to the treating solution, the temperature of the treating bath or the like.

In accordance with the present invention, a film can be produced on a surface of the metal or alloy material without necessity of the process in which harmful substances (heavy metal salts) are used.

Accordingly, the resultant film does not contain harmful substances. For this reason, no environmental pollution is caused, for example, upon recycling.

The color tone of the resultant film can be varied depending upon kinds of organometallic compounds used. For example, in the case where a metal alkoxide of Si is used as the organometallic compound, a film which is colorless and transparent and exhibits an excellent anti-corrosion property can be obtained, so that a metallic appearance inherent to the metal or alloy material can be maintained.

EXAMPLES

The present invention will be described in detail hereinafter by way of specific experimental examples.

Experimental Example 1

This Experimental Example was conducted under various treating conditions (including a treating time and a bath temperature).

First, a rolled plate made of magnesium (Tradename "AZ31" having a size of 70 mm×150 mm×31 mm) was degreased and pickled. Thereafter, the rolled plate was immersed in a treating bath maintained at 25° C. The thus-treated rolled plate was washed with water and then dried.

The treating solution in the bath was composed of 0.67 mol/liter of $Si(OCH_3)_4$ and 0.005 mol/liter of $NH_4OH$.

The resultant film formed on the rolled plate was examined and evaluated with respect to a color tone and an anti-corrosion property thereof.

(1) Treating Time and Color Tone

The relationship between the treating time and the color tone are shown in Table 1 below and in FIG. 1.

TABLE 1

| Time (min) | 1 | 2 | 3 | 5 | 10 | 30 |
|---|---|---|---|---|---|---|
| Color tone | Colorless and transparent | Colorless and transparent | Colorless and transparent | Colorless and transparent | Colorless and transparent | Translucent |

As is appreciated from Table 1, in this Experimental Example, almost colorless and transparent films were obtained even when the treating time was changed.

(2) Bath Temperature and Color Tone

Figure 2:
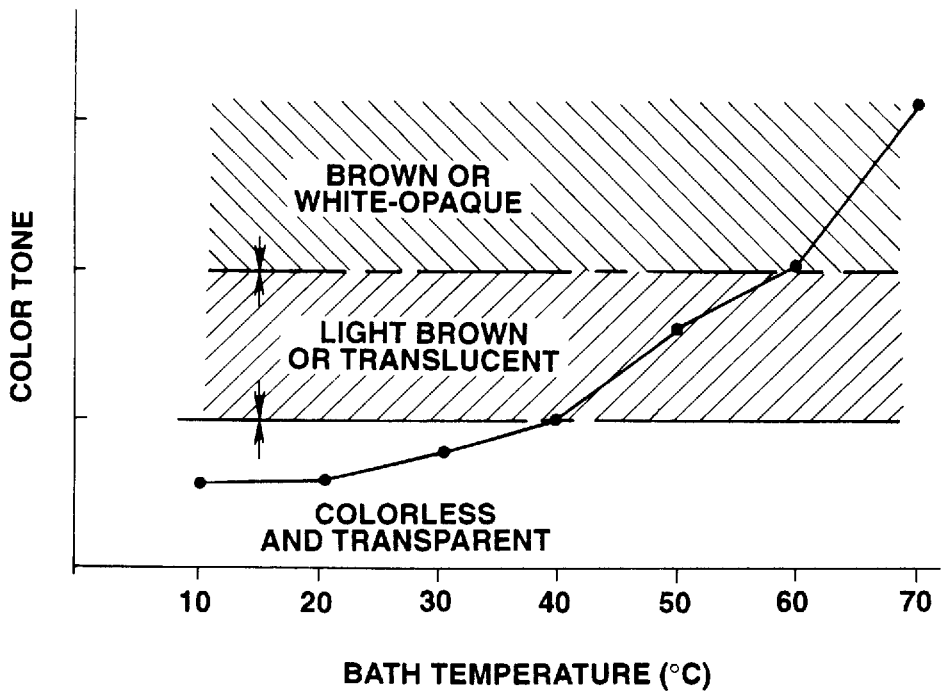
FIG. 2 is a characteristic curve showing the relationship between color tone of an anodic oxide film and bath temperature.

FIG. 2 and Table 2 show the change in color tone of the film obtained when the treating time was kept unchanged but the bath temperature was varied.

TABLE 2

| Bath temperature (°C.) | 10 | 20 | 30 | 40 | 50 |
|---|---|---|---|---|---|
| Color tone | Colorless and transparent | Colorless and transparent | Colorless and transparent | Colorless and transparent | Translucent |

As is appreciated from Table 2 and FIG. 2, the change in color tone of the film was observed when the bath temperature was increased to more than 40° C. Further, it was revealed that, when the bath temperature was increased to more than 50° C., the change in color tone of the film became more remarkable. Accordingly, it was found that the bath temperature was required to be adjusted to not more than 50° C. in order to obtain a colorless and transparent film.

(3) Anti-Corrosion Property

A magnesium plate was surface-treated in the same manner as previously described. The thus-treated magnesium plate was then subjected to a salt spray test (according to JIS Z-2371) in which an aqueous solution containing 5% by weight of sodium chloride was used, and the results of the test were evaluated by a rating number (R. N.). Also, ordinarily utilized anodic oxide films were tested and evaluated as Comparative Example 1 (Dow 20) and Comparative Example 2 (Dow 21) in the same manner as above. The results are shown in Table 3.

TABLE 3

|  | Untreated | Present Example | Comparative Example 1 | Comparative Example 2 |
|---|---|---|---|---|
| 8 hr. | 10 | 10 | 10 | 10 |
| 24 hr. | 9.5 | 10 | 10 | 10 |
| 48 hr. | 9.0 | 9.8 | 10 | 9.5 |

As is apparent from Table 3, the test sample of the present Example exhibited an anti-corrosion property identical to or more excellent than those of the anodic oxide film samples (Comparative Examples 1 and 2).

Experimental Example 2

The procedure of Experimental Example 1 was repeated in the same manner as described above except that $Si(OC_2H_5)_4$ was used instead of $Si(OCH_3)_4$.

The resultant film was evaluated in the same manner as in Experimental Example 1. It was found that the color tone and the anti-corrosion property of the film of Experimental Example 2 were approximately identical to those of Experimental Example 1. However, there was a tendency that the change in color tone of the film occurred earlier by one rank than that of Experimental Example 1.

Experimental Example 3

The procedure of Experimental Example 1 was repeated in the same manner as described above except that a treating solution composed of 0.05 mol/liter of $Ti(OC_2H_5)_4$, 0.01 mol/liter of $C_2H_4OH$ and 0.001 mol/liter of $(CH_2COOH)_2$, a bath temperature of 20° C. and a treating time of 10 minutes were used.

The resultant film was slightly harder than that of Experimental Example 1 and it was found that the film suffered from cracks. The color tone of the film was slightly white-opaque. The anti-corrosion property of the film was approximately identical to that of Experimental Example 1.

Experimental Example 4

The procedure of Experimental Example 1 was repeated in the same manner as described above except that a treating solution composed of 0.005 mol/liter of $(CH_3)Si(OC_2H_5)_2$ and 0.05 mol/liter of $C_2H_4OH$, a bath temperature of 20° C. and a treating time of 5 minutes were used.

The resultant film exhibited slightly interference color tone but a good anti-corrosion property.

Experimental Example 5

The procedure of Experimental Example 1 was repeated in the same manner as described above except that a treating solution composed of 0.5 mol/liter of $Si(OC_2H_5)_4$ and 30 mol/liter of $C_2H_4OH$, a bath temperature of 20° C. and a treating time of 10 minutes were used.

The resultant film exhibited a good color tone and a good anti-corrosion property.

As described above, by using the process according to the present invention, it is possible to form, for example, a colorless and transparent film having an excellent anti-corrosion property on a surface of a metal or alloy material such as magnesium-based metal materials, so that a metallic appearance inherent to the metal or alloy material can be maintained.

Further, in the process according to the present invention, since no effluent containing heavy metals is produced, risk of causing environmental pollution is considerably reduced. In addition, in the case where the surface-treated product is recycled, no specific pretreatment is required for re-melting thereof. Accordingly, the process for surface-treating a body of metal according to the present invention is favorable to environmental protection.

What is claimed is:

1. A process for surface-treating a body made of metal, comprising a step of:
   immersing said body made of metal in an aqueous solution comprising
   at least one compound selected from the group consisting of $Si(OCH_3)_4$ and $Si(OC_2H_5)_4$ and
   at least one film-forming assistant, thereby forming a transparent film on a surface of the body made of metal.

2. A process according to claim 1, wherein said metal is magnesium or a magnesium alloy.

3. A process according to claim 1, wherein the concentration of said compound in the aqueous solution is in the range of 0.0005 to 10 mol/liter and the concentration of said film-forming assistant in the aqueous solution is in the range of 0.0001 to 50 mol/liter.

4. A process according to claim 3, wherein the concentration of said compound in the aqueous solution is in the range of 0.05 to 3 mol/liter and the concentration of said film-forming assistant in the aqueous solution is in the range of 0.0005 to 10 mol/liter.

5. A process according to claim 1, wherein said aqueous solution is maintained at a temperature ranging from 0° to 50° C.

6. A process according to claim 1, wherein said film-forming assistant is a film-forming accelerator or a film-forming stabilizer.

7. A process according to claim 6, wherein said film-forming accelerator or said film-forming stabilizer is at least one selected from the group consisting of an acid, an alkali, a salt thereof, and an organometallic compound containing any of a hydroxyl group, a carboxyl group and an amino group.

* * * * *